US011038880B2

(12) United States Patent
Chakraborty et al.

(10) Patent No.: US 11,038,880 B2
(45) Date of Patent: *Jun. 15, 2021

(54) ENCRYPTED BIOMETRIC AUTHENTICATION

(71) Applicant: Bank of America Corporation, Charlotte, NC (US)

(72) Inventors: Pinak Chakraborty, Telangana (IN); Sandeep K. Chauhan, Telangana (IN)

(73) Assignee: Bank of America Corporation, Charlotte, NC (US)

(*) Notice: Subject to any disclaimer, the term of this patent is extended or adjusted under 35 U.S.C. 154(b) by 145 days.

This patent is subject to a terminal disclaimer.

(21) Appl. No.: 16/576,955

(22) Filed: Sep. 20, 2019

(65) Prior Publication Data
US 2020/0014684 A1    Jan. 9, 2020

Related U.S. Application Data

(63) Continuation of application No. 15/258,110, filed on Sep. 7, 2016, now Pat. No. 10,425,408.

(51) Int. Cl.
*H04L 9/06* (2006.01)
*H04L 9/32* (2006.01)
*H04L 29/06* (2006.01)
*G06F 21/45* (2013.01)
*H04W 12/06* (2021.01)

(52) U.S. Cl.
CPC ........ *H04L 63/0861* (2013.01); *H04L 9/3231* (2013.01); *H04L 9/3236* (2013.01); *H04L 63/0428* (2013.01); *H04L 63/1466* (2013.01)

(58) Field of Classification Search
CPC . H04L 63/0861; H04L 9/3231; H04L 9/3236; G06F 21/32; G06F 21/45
See application file for complete search history.

(56) References Cited

U.S. PATENT DOCUMENTS 6,735,695 B1   5/2004  Gopalakrishnan et al.
8,296,573 B2  10/2012  Bolle et al.
8,423,786 B2   4/2013  Takaku et al.
(Continued)

OTHER PUBLICATIONS

Hao et al "Combining cryptography with biometrics effectively", University of Cambridge Technical Report, Jul. 2005 (Year: 2005).*

*Primary Examiner* — Noura Zoubair
(74) *Attorney, Agent, or Firm* — Michael A. Springs

(57) ABSTRACT

In an embodiment of the present disclosure, an embodiment includes a user device comprises a conversion engine configured to receive a biometric file comprising biometric identification information of a user and convert the biometric file into a first numeric representation. The user device further comprises a hashing engine configured to create a superimposed numeric representation by performing a convolution operation on the first numeric representation and a second numeric representation, wherein the second numeric representation is based on a key file that is different from the biometric file. The hashing engine is further configured to convert the superimposed numeric representation into a hash value, send, over a network connection, the hash value for authentication, and receive a message indicating whether authentication was successful.

19 Claims, 6 Drawing Sheets

(56) References Cited

U.S. PATENT DOCUMENTS

| | | | |
|---|---|---|---|
| 8,996,886 B2 | 3/2015 | Baughman et al. | |
| 2008/0205644 A1* | 8/2008 | Lee .................... | H04N 21/2347 380/210 |
| 2014/0270405 A1* | 9/2014 | Derakhshani ...... | G06K 9/00597 382/117 |
| 2016/0048669 A1* | 2/2016 | Kim .................... | G06K 9/0061 726/19 |

\* cited by examiner

ENCRYPTED BIOMETRIC AUTHENTICATION

CROSS-REFERENCE TO RELATED APPLICATIONS

This application is a continuation of U.S. patent application Ser. No. 15/258,110 filed Sep. 7, 2016, by Pinak Chakraborty et al., and entitled "Encrypted Biometric Authentication," which is incorporated herein by reference.

TECHNICAL FIELD

The present disclosure relates generally to encrypted authentication, and more specifically to encrypted biometric authentication.

BACKGROUND

System administrators and users protect information stored on various systems. Authentication provides a means of ensuring that only particular users have permission to access a system and/or the information stored therein. Some forms of authentication use biometric information to determine whether a particular user has access to a system.

SUMMARY OF EXAMPLE EMBODIMENTS

In an embodiment of the present disclosure, a user device comprises a conversion engine configured to receive a biometric file comprising biometric identification information of a user and convert the biometric file into a first numeric representation. The user device further comprises a hashing engine configured to create a superimposed numeric representation by performing a convolution operation on the first numeric representation and a second numeric representation, wherein the second numeric representation is based on a key file that is different from the biometric file. The hashing engine is further configured to convert the superimposed numeric representation into a hash value, send, over a network connection, the hash value for authentication, and receive a message indicating whether authentication was successful.

In accordance with the present disclosure, disadvantages and problems associated with authentication systems, and particularly biometric authentication systems, may be reduced or eliminated, and one or more technical advantages may be realized. For example, some embodiments of the present disclosure may reduce or eliminate the need to store a user's actual biometric identification information or its numeric representation in a system's memory, e.g., a server, thus making the user's biometric identification information more secure and/or reducing system memory usage. Such benefits may, for example, apply to registration of the user's biometric identification information for reference and use in future authentication requests. Certain embodiments may reduce or eliminate the need to transmit a user's actual biometric identification information or its numeric representation, e.g., over a network connection, thus making the user's biometric identification information more secure and/or reducing network traffic. Particular embodiments of the present disclosure may allow for an additional layer of protection for user information (e.g., a user's biometric identification information) by making it more difficult or virtually impossible to derive a user's actual biometric identification information from authentication information sent according to this disclosure, even after an identity thief successfully intercepts such authentication information during user authentication over a network connection (e.g., during a successful "man-in-the-middle attack"). In addition, certain embodiments allow a user to choose, revoke, and/or change the form of his biometric identification information used for authentication, e.g., by modifying the user's actual biometric information consistent with this disclosure. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE EXAMPLE DRAWINGS

For a more complete understanding of the present disclosure and for further features and advantages thereof, reference is now made to the following description taken in conjunction with the accompanying example drawings, in which.

DETAILED DESCRIPTION

Figure 1:
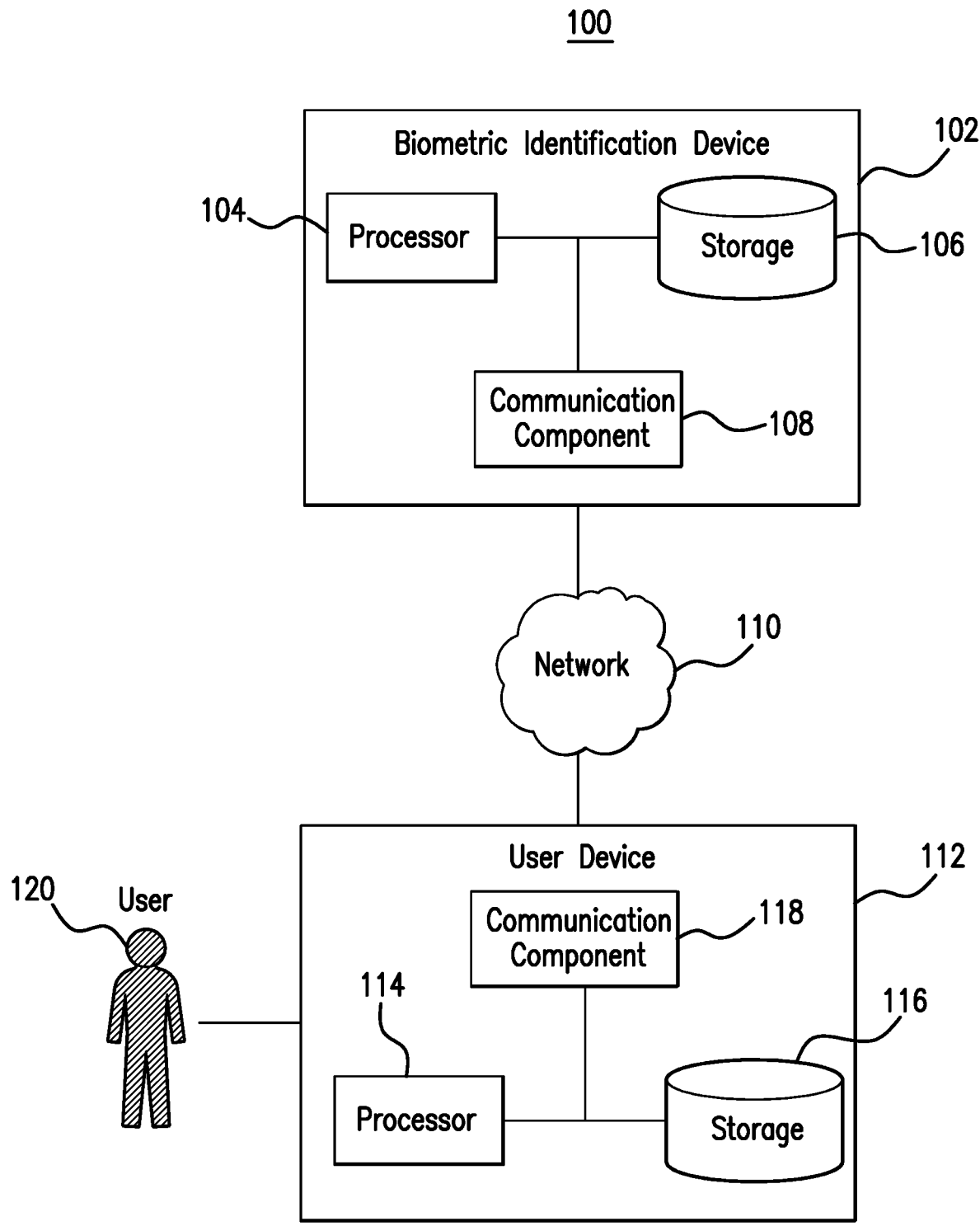
FIG. 1 illustrates an overview of an example authentication system containing, for example, a biometric authentication device and a user device.

System administrators and users protect information stored on various systems. Authentication provides a means of ensuring that only particular users have permission to access a system and/or the information stored therein. Some forms of authentication use biometric information to determine whether a particular user has access to a system (e.g., a fingerprint, a photograph of the user's face, a sample of the user's voice, etc.). In addition, users sometimes transmit information between user devices and systems over network connections that pose security risks, for example, the risk of exposing biometric information or other authentication information during transit. Furthermore, some systems store such authentication information on servers or other storage, which may be improperly accessed by, for example, identity thieves. In addition, a user may not be able to change or replace certain biometric information once it is stolen, made public, or otherwise compromised. For example, a user may find it difficult, to change his fingerprints, voice, face, or other biometric information if representations of his biometric information are compromised. Similarly, a user has less control over biometric authentication if he uses only his biometric information for authentication, because he cannot reasonably change his biometric information (like he could change a standard password, for example). Authentication systems may benefit from encrypting authentication information, such as a user's biometric identification information according to the embodiments of this disclosure. For example, some embodiments of the present disclosure may mitigate or eliminate some or all of the above concerns, and some embodiments of the present disclosure may provide some, all, or none, of the technical advantages that are described herein or are readily apparent to a person of ordinary skill in the art.

In an example embodiment of the present disclosure, a user first registers his biometric identification information. For example, the user scans his fingerprint to produce an image of his fingerprint and makes the image available to a biometric identification device. The biometric identification device also receives another image in this example, e.g., of a Ferris wheel, and converts both the fingerprint image and the Ferris wheel image into numerical representations. Then, in this embodiment, the biometric identification device combines the two numerical representations to create a combined value (e.g., ultimately a hash value) that is both specific to the user's biometric information (the fingerprint image) and encrypted due to the combination of the fingerprint image with the Ferris wheel image. This combined value may be more secure than the image or numerical representation of the fingerprint alone, because it may be difficult to undo the combination of the fingerprint image and the Ferris wheel to obtain the fingerprint image. Thus, in this embodiment, the biometric identification device can more safely register the fingerprint by saving the combined value and, in some embodiments, deleting the fingerprint image and/or numerical representation thereof.

The example embodiment discussed above may continue when the user attempts to authenticate himself in the future to access a system (e.g., a personal account) protected by the biometric identification device. In this example embodiment, the user may use a user device (e.g., a mobile phone) to scan his fingerprint. The user may also select the same image of the Ferris wheel, and the user device may convert both the image of the fingerprint and the Ferris wheel image into numerical representations. Similar to the registration the process, the user device may combine the two numerical representations to create a combined value (e.g., ultimately a hash value), which may be more secure than the fingerprint image alone. The user device in this example then sends the combined value to the biometric identification device, which compares the combined value created during registration to the combined value sent by the user seeking authentication (e.g., to access his personal account). If the biometric identification device finds that the two combined values are similar enough, it may determine that authentication is successful, which in this embodiment may mean that the same finger was used during both registration and authentication. Thus, in this embodiment, the user is able to register his fingerprint in more secure manner by encrypting it with the Ferris wheel image and also to use the same fingerprint to more securely authenticate himself and access his personal account.

Embodiments of the present disclosure and its advantages may be best understood by referring to FIGS. 1-6, like numerals being used for like and corresponding parts of the various drawings.

FIG. 1 illustrates an overview of an example authentication system 100 containing, for example, a biometric authentication device 102 and a user device 112. In general, authentication system 100 may register a user's biometric identification information and/or authenticate a user or user device using the user's biometric identification information, according to certain embodiments. The system of FIG. 1 includes biometric authentication device 102 and user device 112, each having a processor (104, 114), a storage (106, 116), and a communication component (108, 118). In addition, in the embodiment of FIG. 1, biometric authentication device 102 and user device 112 connect to a network 110 and may communicate over network 110. FIG. 1 also illustrates a user 120 that interacts with user device 112. Biometric authentication device 102 is described in more detail in FIG. 2, and user device 112 is described in more detail in FIG. 4.

Biometric identification device 102 generally assists with registering biometric identification information for authentication purposes, in certain embodiments. In particular embodiments, biometric identification device 102 assists with authenticating a user (e.g. user 102) after the user has registered his biometric identification information for authentication purposes. Biometric identification device 102 may function as described elsewhere in this disclosure, for example, with regard to FIGS. 2-6. In some embodiments, biometric identification information is biometric information that identifies a particular user, for example, a representation of a user's face, fingerprints, retina, appearance, voice, or any other suitable biometric information. Biometric identification device 102 is shown as connected to network 110 in this embodiment, and as having processor 104, storage 106, and communication component 108. In general, processor 104 performs operations and processes data in biometric identification device 102 and is any device suitable for such purposes. In certain embodiments, processor 104 may help perform any and all functions of biometric identification device 102 as described in this disclosure. In general, storage 106 is a data/memory storage that stores data in or for biometric identification device 102. In certain embodiments, storage 106 may not be permanent storage, but rather temporary storage, such as a data cache, though storage 106 may be any suitable type of storage, including permanent storage, cloud storage, etc. In some embodiments, storage 106 stores some or all of the data used by biometric identification device 102 to operate as described in this disclosure. In general, communication component 108 allows biometric identification device 102 to communicate with other devices over network connections, for example network 110, user device 112, etc. This disclosure contemplates processor 104, storage 106, and communication component 108 being configured to perform any of the functions of biometric identification device 102 described herein.

Biometric identification device 102 is any device capable of communicating with other components of authentication system 100. For example, biometric identification device 102 may execute applications that use information stored on storage 106 or network 110. Biometric identification device 102 may also write data to storage 106 or network 110. Additionally, biometric identification device 102 may issue messages or commands to other devices and systems, for example, a system biometric identification device 102 protects/limits access to. This disclosure contemplates biometric identification device 102 being any appropriate device for sending and receiving communications over network 110. As an example and not by way of limitation, biometric identification device 102 may be a computer, server, a laptop, a wireless or cellular telephone, an electronic notebook, a personal digital assistant, a tablet, or any other device capable of receiving, processing, storing, and/or communicating information with other components of authentication system 100. Biometric identification device 102 may also include a user interface, such as a display, a microphone, keypad, or other appropriate terminal equipment usable by user 120 or an administrator of a system protected by biometric identification device 102. In some embodiments, an application executed by biometric identification device 102 may perform the functions described herein.

Processor 104 is any electronic circuitry, including, but not limited to microprocessors, application specific integrated circuits (ASIC), application specific instruction set processor (ASIP), and/or state machines, that communicatively couples to storage 106 and controls the operation of biometric identification device 102. Processor 104 may be 8-bit, 16-bit, 32-bit, 64-bit or of any other suitable architecture. Processor 104 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 104 may include other hardware and software that operates to control and process information. Processor 104 executes software stored on memory to perform any of the functions described herein. Processor 104 controls the operation and administration of biometric identification device 102 by processing information received from, e.g., network 110, user device 112, and storage 106. Processor 104 may be a programmable logic device, a microcontroller, a microprocessor, any suitable processing device, or any suitable combination of the preceding. Processor 104 is not limited to a single processing device and may encompass multiple processing devices.

Storage 106 may store, either permanently or temporarily, data, operational software, or other information for processor 104. Storage 106 may include any one or a combination of volatile or non-volatile local or remote devices suitable for storing information. For example, storage 106 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in storage 106, a disk, a CD, or a flash drive. In particular embodiments, the software may include an application executable by processor 104 to perform one or more of the functions described herein.

User device 112 generally allows a user (e.g., user 120) to access a system (e.g., having biometric identification device 102) using the user's biometric identification information. In some embodiments, user device 112 assists with authenticating a user (e.g. user 102) after the user has registered his biometric identification information for authentication purposes, in certain embodiments. In particular embodiments, user device 112 assists with registering biometric identification information for authentication purposes. User device 112 may function as described elsewhere in this disclosure, for example, with regard to FIGS. 2-6. User device 112 is shown as connected to network 110 in this embodiment, and as having processor 114, storage 116, and communication component 118. In general, processor 104 performs operations and processes data in user device 112 and is any device suitable for such purposes. In certain embodiments, processor 114 may help perform any and all functions of user device 112 as described in this disclosure. In general, storage 106 is a data/memory storage that stores data in or for user device 112. In certain embodiments, storage 116 may not be permanent storage, but rather temporary storage, such as a data cache, though storage 116 may be any suitable type of storage, including permanent storage, cloud storage, etc. In some embodiments, storage 116 stores some or all of the data used by user device 112 to operate as described in this disclosure. In general, communication component 118 allows user device 112 to communicate with other devices over network connections, for example network 110, user device 112, etc., and may be any suitable communications link (e.g., a network card). This disclosure contemplates processor 114, storage 116, and communication component 118 being configured to perform any of the functions of user device 112.

User device 112 is any device capable of communicating with other components of authentication system 100. For example, user device 112 may execute applications that use information stored on storage 116 or network 110. User device 112 may also write data to storage 116 or network 110. Additionally, user device 112 may issue messages or commands to other devices and systems, for example, biometric identification device 102. This disclosure contemplates user device 112 being any appropriate device for sending and receiving communications over network 110. As an example and not by way of limitation, user device 112 may be a computer, server, a laptop, a wireless or cellular telephone, an electronic notebook, a personal digital assistant, a tablet, or any other device capable of receiving, processing, storing, and/or communicating information with other components of authentication system 100. User device 112 may also include a user interface, such as a display, a microphone, keypad, or other appropriate terminal equipment usable by user 120. In some embodiments, an application executed by user device 112 may perform the functions described herein.

Processor 114 is any electronic circuitry, including, but not limited to microprocessors, application specific integrated circuits (ASIC), application specific instruction set processor (ASIP), and/or state machines, that communicatively couples to storage 116 and controls the operation of user device 112. Processor 114 may be 8-bit, 16-bit, 32-bit, 64-bit or of any other suitable architecture. Processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 114 may include other hardware and software that operates to control and process information. Processor 114 executes software stored on memory to perform any of the functions described herein. Processor 114 controls the operation and administration of user device 112 by processing information received from, e.g., network 110, biometric identification device 102, and storage 116. Processor 114 may be a programmable logic device, a microcontroller, a microprocessor, any suitable processing device, or any suitable combination of the preceding. Processor 114 is not limited to a single processing device and may encompass multiple processing devices.

Storage 106 may store, either permanently or temporarily, data, operational software, or other information for processor 114. Storage 116 may include any one or a combination of volatile or non-volatile local or remote devices suitable for storing information. For example, storage 106 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in storage 106, a disk, a CD, or a flash drive. In particular embodiments, the software may include an application executable by processor 114 to perform one or more of the functions described herein.

Network 110 connects certain elements of this disclosure, in some embodiments. For example, network 110 may connect biometric authentication device 102 and user device 112, allowing biometric authentication device 102 and user device 112 to communicate using network 110. In certain embodiments, network 110 may be secure or unsecure. In some embodiments, biometric authentication device 102 and user device 112 may each be on the same network, which may be network 110. In other embodiments, biometric authentication device 102 and user device 112 may be on separate networks, one or none of which is network 110 and may communicate with each other using any suitable means. Network 110 may be any local or wide area network that is suitable for use in or with this disclosure, for example: the Internet, a local area network, a private network, a cellular network, etc.

Network 110 facilitates communication between and amongst the various components of authentication system 100. This disclosure contemplates network 110 being any suitable network operable to facilitate communication between the components of authentication system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

While certain components of certain devices are shown in FIG. 1 in certain configurations, other suitable components, devices, and configurations are contemplated in this disclosure.

Figure 2:
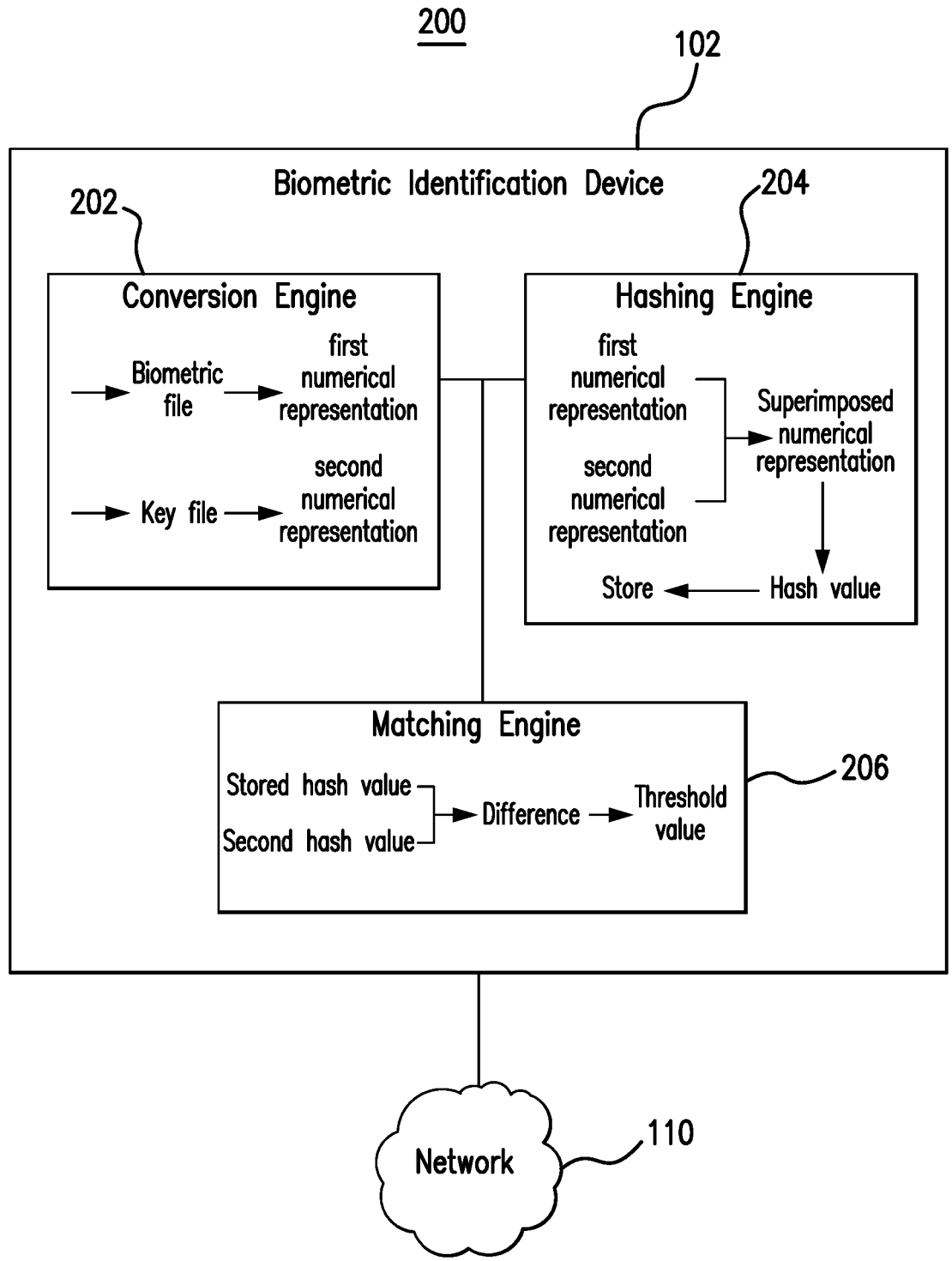
FIG. 2 illustrates an example system showing an example structure of the biometric identification device of FIG. 1.

FIG. 2 illustrates an example system 200 showing an example structure of the biometric identification device 102 of FIG. 1. In this example, biometric identification device 102 is shown connected to network 110 and contains conversion engine 202, hashing engine 204, and matching engine 206. In some embodiments, some or all of the components of biometric identification device 102 may perform some or all of the steps of method 300, method 500, and/or the steps described with regard to FIG. 6.

Conversion engine 202, in general, converts objects (e.g., photographs, finger tips) to digital files and/or converts digital files into numerical representations, according to particular embodiments. For example, conversion engine 202 may scan or receive a fingerprint (or fingerprint representation) or image or audio file and convert the fingerprint or image or audio file into a numerical representation (different from any original, e.g. binary, representation of the image or audio file itself), such as a matrix. For example, conversion engine 202 may convert a biometric file, which may be a file containing a user's biometric information, into a first numerical representation, such as a matrix. As another example, conversion engine 202 may convert a key file, which may be a file that is different from the biometric file and used to encrypt the biometric file, into a second numerical representation, such as a matrix. In example embodiments, conversion engine 202 may perform steps 304 and 308 of method 300 in FIG. 3, and/or steps 504 and 508 of method 500 of FIG. 5.

Conversion engine 202 may, in an example algorithm, receive a key file, convert the key file into a numerical representation, e.g., by segmenting the key file, creating vectors based on each segment, and creating a matrix based on the vectors. Conversion engine 202 may, in an example algorithm, receive a biometric file, convert the biometric file into a numerical representation, e.g., by segmenting the biometric file, creating vectors based on each segment, and creating a matrix based on the vectors. Conversion engine 202 may, in some embodiments, also operate according to an algorithm based on steps of methods 300 and 500 in this disclosure, e.g., steps 302-308 of method 300.

Hashing engine 204 generally receives the numerical representations processed or created by the conversion engine 202 as inputs and creates a hash value as an output, according to particular embodiments. For example, hashing engine 204 may take the first and second numerical representations and create a superimposed numerical representation that combines the first and second numerical representations, which may help encrypt some or all of the biometric file. Hashing engine 204 may create the superimposed numerical representation as described elsewhere in this disclosure, for example in step 310 of method 300 of FIG. 3 or with regard to FIG. 6. Once hashing engine 204 creates the superimposed numerical representation according to certain embodiments, it may then covert the superimposed numerical representation into a hash value. For example, hashing engine 204 may covert the superimposed numerical representation into a hash value as described elsewhere in this disclosure, for example in steps 312 and 314 of method 300 FIG. 3 or with regard to FIG. 6. Furthermore, in some embodiments, hashing engine 204 may store the hash value, or cause it to be stored in any suitable location. For example, the hash value may be stored in storage 106, in a system that biometric identification device 102 controls access to, in the cloud, or at any other location. The stored hash value, in particular embodiments, may be the result of, or part of, registration of the user whose biometric identification information was contained in the biometric file used to create the stored hash value.

Hashing engine 204 may, in an example algorithm, create a superimposed numerical representation by performing a convolution operation of a numerical representation of a biometric file and a numerical representation of a key file (e.g., as output by conversion engine 202). Furthermore, as part of this example algorithm, hashing engine 204 may covert the superimposed numerical representation into a hash value by performing one or more (or iterative) convolution operations to reduce the superimposed numerical representation into a smaller numerical representation (e.g., a single-row array), and then convert the smaller numerical representation into a hash value (e.g., by converting the single-row array to concatenated binary and then converting the binary into a hash value). In addition, hashing engine 204 may store the hash value, e.g., for registration purposes, as part of this algorithm. Hashing engine 204 may, in some embodiments, also operate according to an algorithm based on steps of methods 300 and 500 in this disclosure, e.g., steps 310-314 of method 300.

Matching engine 206 generally assists with authentication of a user (120) or user device (112) once the user or user device has registered with biometric identification device 102, according to particular embodiments. For example, matching engine 206 may compare the hash value stored by the hashing engine 204 with a second hash value sent to biometric identification device 102 (e.g., from user device 112) for authentication. As an example, matching engine 206 may find a difference between the stored hash value and the second hash value and determine whether the difference is below or above a certain threshold value, which in some embodiments may assist in determining whether the second hash value is close enough to the stored hash value in order for matching engine 206 to authenticate the user or user device that sent the second hash value. In some embodiments, matching engine 206 determines that the stored hash value and the second hash value are close enough for authentication (e.g., have a relatively small difference from one another) when both the stored hash value and the second hash value are created using the same or similar biometric files (containing the same or similar biometric identification information associated with a particular user) and the same or similar key files. For example, the stored hash value may have been created using a fingerprint scan made during registration, and the second hash value may have been created using a fingerprint scan of the same finger during authentication. If the two hash values are similar enough, then that may indicate that the fingerprint scans are similar enough for authentication. Matching engine 206, in certain embodiments, may also send messages regarding whether the second hash value is authenticated or not, for example via communication component 108 to user device 112. Matching engine 206 may operate as described elsewhere in this disclosure, for example in steps 316, 318, 320, 322, and 324 of method 300 FIG. 3.

Matching engine 206 may, in an example algorithm, receive a hash value for authentication, compare it to a stored hash value (e.g., by determining a difference, for example the Hamming distance, between the stored hash value and the hash value for authentication), determine whether the stored hash value and the hash value for authentication are similar enough (e.g., the difference is less than a threshold value), and send a message indicating whether authentication was successful. Matching engine 206 may, in some embodiments, also operate according to an algorithm based on steps of methods 300 and 500 in this disclosure, e.g., steps 316-324 of method 300.

While certain components of certain devices are shown in FIG. 2 in certain configurations, other suitable components, devices, and configurations are contemplated in this disclosure.

Figure 3:
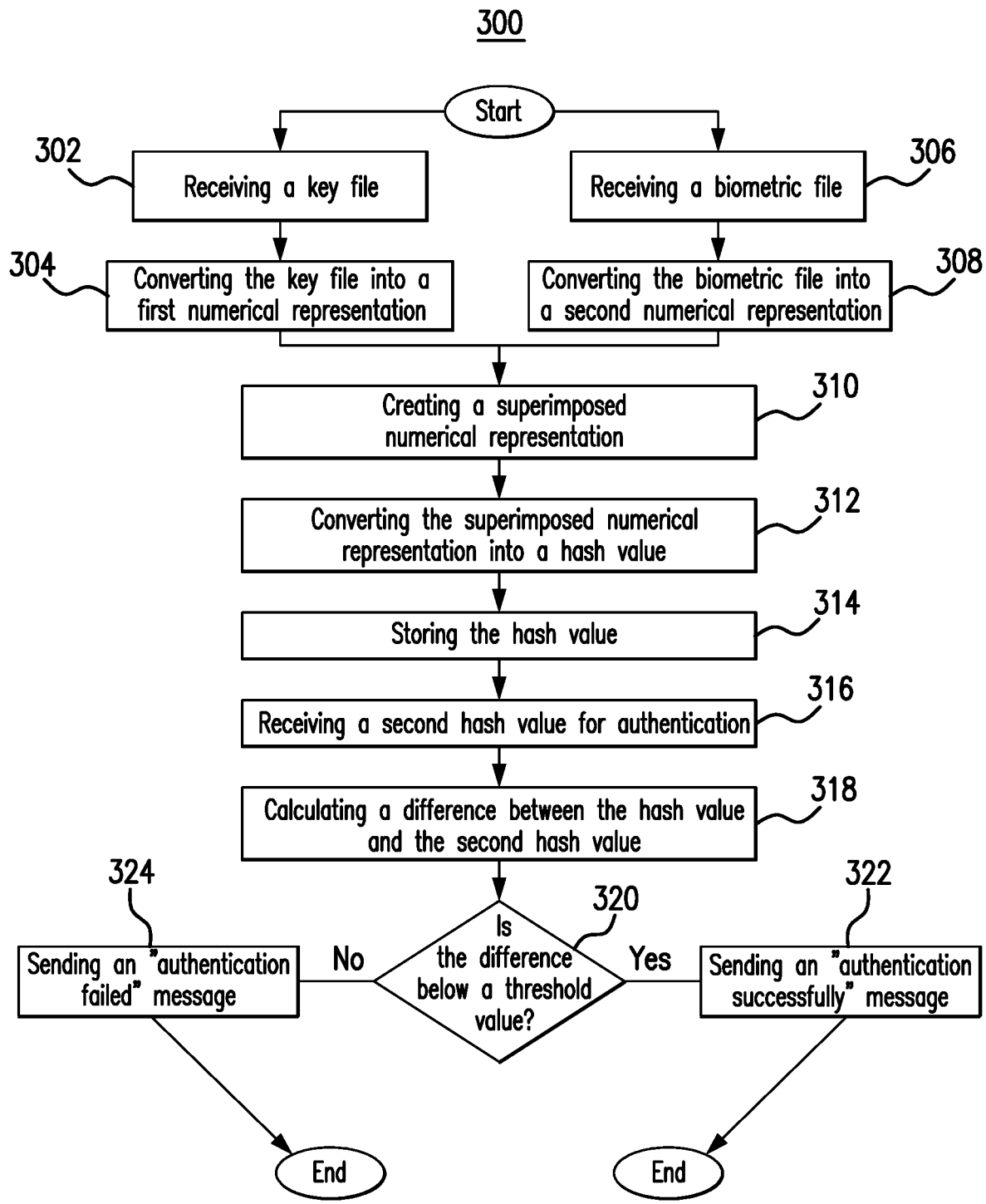
FIG. 3 illustrates an example method of registering and encrypting a user's biometric identification information, as well as authenticating biometric identification information.

FIG. 3 illustrates an example method 300 of registering and encrypting a user's biometric identification information, as well as authenticating biometric identification information. Method 300 may be performed, in some embodiments, by some or all of the components of FIGS. 1, 2, and 4. In particular embodiments, method 300 may employ some or all of the steps of FIGS. 5 and 6. Method 300 contains steps 302 through 324.

Step 302 includes receiving a key file. In some embodiments, a key file is a file other than the biometric file containing a user's biometric identification information. In general, the purpose of the key file is to help encrypt a user's biometric identification information during registration and/or authentication. A key file, in certain embodiments, may be an image selected by a user or, for example, biometric identification device 102. In other embodiments, the key file may be an audio file or any other suitable file. In certain embodiments, biometric identification device 102 receives one or more key files, e.g., automatically, via a selection algorithm, from a user and/or user device 112, over a network or from a local database, social media, or through any other suitable means or from any other suitable source.

Step 304 includes converting the key file into a first numerical representation. For example, the key file may be an image and may be converted into a matrix. In some embodiments, the key file may be segmented (e.g., randomly or not, with or without segment overlap) into n segments, from which a feature vector of dimension m is extracted for each segment. For example, a key file may be an image, which may be segmented into n segments (which may or may not overlap) of rectangular shape (or any other suitable shape). Each segment may then be converted into a feature vector of dimension m, for example, based on a color histogram of the segment, where each element of the feature vector represents a color value, and the value of each element is the number of pixels having the corresponding color value. In some example embodiments, Fourier series or any other suitable means may be used to extract feature vectors from the segments. In particular embodiments, once a set of feature vectors are obtained, an image key file $k_i$ may be converted into a matrix (e.g., feature_matrix_$k_i$) having n rows and m columns, where each row of the matrix is one of the feature vectors, e.g.:

$$\text{feature\_vector\_k}_{i_1} = [f_1, f_2, \ldots f_m]_1$$
$$\text{feature\_vector\_k}_{i_2} = [f_1, f_2, \ldots f_m]_2$$
$$\ldots$$
$$\text{feature\_vector\_k}_{i_n} = [f_1, f_2, \ldots f_m]_n$$

where $f_{1-m}$ are the elements of each feature vector (feature_vector_$k_i$). Any other suitable method of creating a numerical representation of the key file, whether a matrix or other type of numerical representation, is contemplated by this disclosure.

Step 306 includes receiving a biometric file. In some embodiments, a biometric file contains biometric identification information of a user that the user wishes to use as a means of authentication (e.g., a fingerprint, retina scan, facial representation, genetic sequence (portion of the user's DNA or representation thereof), etc. In general, the purpose of the biometric file is to provide information specific to the user for the purpose of providing a secure means of authenticating the user. Before the biometric file can be used in certain embodiments, it may first be registered, e.g., via method 300, in certain embodiments. A biometric file, in certain embodiments, may be an image. In other embodiments, the biometric file may be an audio file or any other suitable file. In certain embodiments, biometric identification device 102 receives one or more biometric files, e.g., automatically, from the user located at or near a system or component associated with biometric identification device 102 (e.g., provided without sending the biometric file over an unsecure, or any, network connection), from a user via user device 112, or through any other suitable means of any security level.

Step 308 includes converting the biometric file into a second numerical representation. For example, the biometric file may be an image and may be converted into a matrix. In some embodiments, the biometric file may be segmented (e.g., randomly or not, with or without segment overlap) into n segments (not necessarily the same value as the numeric representation of the key image), e.g., rectangular portions of the biometric file, from which a feature vector of dimension m (not necessarily the same value as the numeric representation of the key image) is extracted for each segment. For example, a biometric file may be an image, which may be segmented into n segments (which may or may not overlap) of rectangular shape (or any other suitable shape). Each segment may then be converted into a feature vector of dimension m, for example, based on a color histogram of the segment, where each element of the feature vector represents a color value, and the value of each element is the number of pixels having the corresponding color value. In some example embodiments, Fourier series or any other suitable means may be used to extract feature vectors from the segments. In particular embodiments, once a set of feature vectors are obtained, an image biometric file $i_o$ may be converted into a matrix (e.g., feature_matrix_$i_o$) having n rows and m columns, where each row of the matrix is one of the feature vectors, e.g.:

$$\text{feature\_vector\_i}_{o_1} = [f_1, f_2, \ldots f_m]_1$$
$$\text{feature\_vector\_i}_{o_2} = [f_1, f_2, \ldots f_m]_2$$
$$\ldots$$
$$\text{feature\_vector\_i}_{o_n} = [f_1, f_2, \ldots f_m]_n$$

where $f_{1-m}$ are the elements of each feature vector (feature_vector_$i_o$). Any other suitable method of creating a numerical representation of the biometric file, whether a matrix or other type of numerical representation, is contemplated by this disclosure.

Step 310 includes creating a superimposed numeric representation (SNR). In general, the SNR is a combination of the first numerical representation and the second numerical representation. For example, feature_matrix_$k_f$ and feature_matrix_$i_o$ may undergo a convolution operation, which in some embodiments, may create a single superimposed matrix (feature_matrix_superimposed). In one embodiment, feature_matrix_superimposed may have dimensions n by m. Any suitable convolution operation is contemplated, including an XOR operation, matrix multiplication, etc.

Step 312 includes converting the SNR into a hash value. In general, step 312 reduces a potentially large, complex, and/or sensitive-information-rich SNR and converts it into a hash value that can be used to, for example, register and/or authenticate a user. In certain embodiments, the hash value may be specific to a user's biometric identification information (e.g., as expressed in feature_matrix_$i_o$), while also making it difficult or impossible to extract the user's biometric identification information from the hash value itself. In particular embodiments, the SNR, and data from any intermediate steps taken in converting to a hash value, are deleted to further decrease the possibility of extracting any biometric identification information from the hash value, the SNR, or any intermediate steps. An example of step 312 is shown in more detail in FIG. 6.

In an example embodiment, the feature_matrix_superimposed matrix may first undergo one or more convolution operations to reduce it to a single-row array. In some embodiments, where feature_matrix_superimposed has dimensions of n rows by m columns, the single-row array may have one row of m elements. In an example embodiment for reducing a matrix to a single-row array via one or more convolution operations, a window W is selected, which may be chosen randomly and may be chosen such that $1<W<n/2$. In this example, for all rows in each window W, the rows are converted into a single row. For example, if n is 11 and W is 4, rows 1-4 of feature_matrix_superimposed would be in a first window, rows 5-8 would be in a second window, and rows 9-11 would be in a third window. Then, in this example embodiment, each set of rows in each window is converted into a single row. For example, for each column of the rows in each window W, the standard deviation of the values of each column may be taken, which produces a single row made of the standard deviation values for each column. In this example, an intermediate matrix having 3 rows (one for each window) is produced. In certain embodiments, the process is repeated until a single-row array is formed (for example, if $n=W^x$, then after repeating the example reduction step above about x times, a single-row array will result in some embodiments). Thus, in this example, where W is 4, the 3 rows of the intermediate matrix are in a single window, which is reduced to a single-row array (e.g., using the reduction step described above). While this example shows one type of convolution operation occurring twice (in two steps or iterations), any convolution operation, or combination of convolution operations, may be used having any number of steps or iterations.

In some embodiments, the single-row array is converted into a hash value. For example, each element of the single-row array may be converted to its binary equivalent. In certain embodiments, these binary equivalent values may then be concatenated together. The concatenated binary values may then be converted into a hash value in any suitable manner. While this disclosure describes certain example methods of performing step 312, any suitable method of converting an SNR into a hash value may be used.

Step 314 includes storing the hash value. In certain embodiments, the hash value may be stored as a part of registering a user's biometric identification information (e.g., in the form of the hash value), which may also be used for future authentication of a user trying to access the system. For example, the hash value may be stored on or by biometric identification device 102, such as in storage 106. In some embodiments, the hash value is stored (e.g., on or by user device 112, such as in storage 116) and used for authentication. The hash value may be stored in any suitable location on any suitable type of storage media or memory. The hash value, in certain embodiments, may be stored such that it is associated with a particular user (120), user device (112), or information associated with a particular user (120) or user device (112). This may facilitate, in example embodiments, future authentication requests originating from that user or user device. In particular embodiments, once the hash value has been stored, some or all of the biometric file, the key file, and any numerical representation (and any intermediate step thereof) may be deleted, which may increase the security of the system. For example, once biometric identification device 102 determines and stores the hash value, it may delete some or all information used to create the hash value.

Step 316 includes receiving a second hash value for authentication. In certain embodiments, the second hash value is received in order to authenticate a user and/or user device. For example, a user device 112 may send the second hash value to biometric identification device 102 for the purpose of authenticating user 120 and/or user device 112. In this example, the second hash value may contain, or may have been created using, user 120's biometric identification information (e.g., in a similar way that the hash value of step 312 was created). In certain embodiments, the second hash value may be the hash value sent in step 516 of method 500 in FIG. 5.

Step 318 includes calculating a difference between the hash value and the second hash value. In general, step 318 includes making a determination of how similar the hash value and the second hash value are, e.g., by comparing the stored hash value and the second hash value. For example, the Hamming distance between the first hash value and the second hash value may be determined. As an example, if $i_o$ is the biometric file presented by a user during registration, $i_p$ is the biometric file presented by a user during authentication, $k_i$ is the key image presented during registration (and authentication if the same key image is used, e.g., chosen by the user), and h is a hashing function that creates a hash value (e.g., as described earlier in the steps of method 300), then the Hamming distance (HD) may equal:

$$HD(h(i_p,k_i),h(i_o,k_i))$$

While step 318 describes determining the Hamming distance in a particular manner, any suitable method to determine a difference between the hash value and the second hash value may be used.

Step 320 includes determining whether the difference calculated at step 318 is below a threshold value. In general, a threshold value is set such that if the difference between the hash value and the second hash value is below the threshold, then authentication is deemed successful (and method 300 continues to step 322). In certain embodiments, successful authentication may indicate that the biometric identification information used to make the second hash value is similar enough to the biometric identification information (e.g., contained in the biometric file of step 306) used to make the hash value, such that the system is confident that a particular registered user having particular biometric identification information is seeking, and should be granted, authentication and system access. Conversely, if the difference between the hash value and the second hash value is above the threshold, then authentication is deemed unsuccessful (and method 300 continues to step 324). For example, if θ is the threshold, then a successful authentication may occur when:

$$HD(h(i_p,k_i),h(i_o,k_i))<\theta$$

which may indicate that $i_o$ is approximately equal to $i_p$ (the biometric files are the same/similar—e.g., similar fingerprint scans) and $k_i$ is a key file chosen during registration (and again during authentication, thus providing additional security in certain embodiments).

Step 322 includes sending an "authentication successful" message. For example, upon determining that authentication is successful, biometric identification device 102 may send a message to user device 112 or user 120 indicating that authentication was successful. In some embodiments, upon determining that authentication is successful, the system may send to another portion of the system or an associated database or other component a message indicating that authentication was successful, for example, to track information related to a user or user device's access to the system. For example, biometric identification device 102 may send a message to a database, storage, or other component indicating that authentication was successful and/or that user 120 or user device 112 successfully accessed the system.

Step 324 includes sending an "authentication failed" message. For example, upon determining that authentication is unsuccessful, biometric identification device 102 may send a message to user device 112 or user 120 indicating that authentication was unsuccessful. In some embodiments, upon determining that authentication is unsuccessful, the system may send to another portion of the system or an associated database or other component a message indicating that authentication was unsuccessful, for example, to track information related to a user or user device's access (or attempted access) to the system. For example, biometric identification device 102 may send a message to a database, storage, or other component indicating that authentication was unsuccessful and/or that user 120 or user device 112 failed to access the system. In certain embodiments, if authentication is unsuccessful after a certain number of attempts, biometric identification device (or the system it protects) may lock, block, or otherwise restrict a certain user, account, etc. or, e.g., notify an administrator or system.

While the steps of method 300 disclosed above discuss creating a single hash value from a biometric file and a key file, in certain embodiments multiple hash files may be created. For example, multiple different hash values associated with the same biometric identification information (e.g., a particular biometric file) may be created using different key files (e.g., a number of different images that are different from the biometric file). In some embodiments, these multiple different hash values may be stored (e.g., on or by biometric identification device 102), and, in certain embodiments, the Hamming distance between the second hash value (of step 316) and each of the number of different hash values may be determined, such that a number of different Hamming distances are determined (e.g., as part of step 318). In particular embodiments, the lowest Hamming distance between the second hash value and each of the number of different hash values may be used to determine whether the threshold of step 320 is met. This disclosure contemplates any suitable determination/calculation and use of multiple hash values. For example, if min( ) is the minimum of the different Hamming distances HD, i.e., the shortest/smallest Hamming distance, for all ($\forall$) of a number, i, of different key files $k_i$, and θ is the threshold value, then a successful authentication may occur when:

$$\min(HD(h(i_p,k_i),h(i_o,k_i),\forall_i)<\theta$$

which may indicate that $i_o$ is approximately equal to $i_p$ (the biometric files are the same/similar—e.g., similar fingerprint scans) and $k_i$ are key files chosen during registration (and, for at least one $k_i$, again during authentication, thus providing additional security in certain embodiments).

Although this disclosure describes and illustrates particular steps of the method of FIG. 3 as occurring in a particular order, this disclosure contemplates any steps of the method of FIG. 3 occurring in any order. An embodiment can repeat or omit one or more steps of the method of FIG. 3. In an embodiment, some or all of the steps of the method of FIG. 3 can include or replace some or all of the steps of the method of FIG. 5 (and, e.g., the steps of FIG. 6). In an embodiment, some or all of the steps of the method of FIG. 5 (and, e.g., the steps of FIG. 6) can include or replace some or all of the steps of the method of FIG. 3. Moreover, although this disclosure describes and illustrates particular components carrying out particular steps of the method of FIG. 3, this disclosure contemplates any combination of any components carrying out any steps of the method of FIG. 3.

Figure 4:
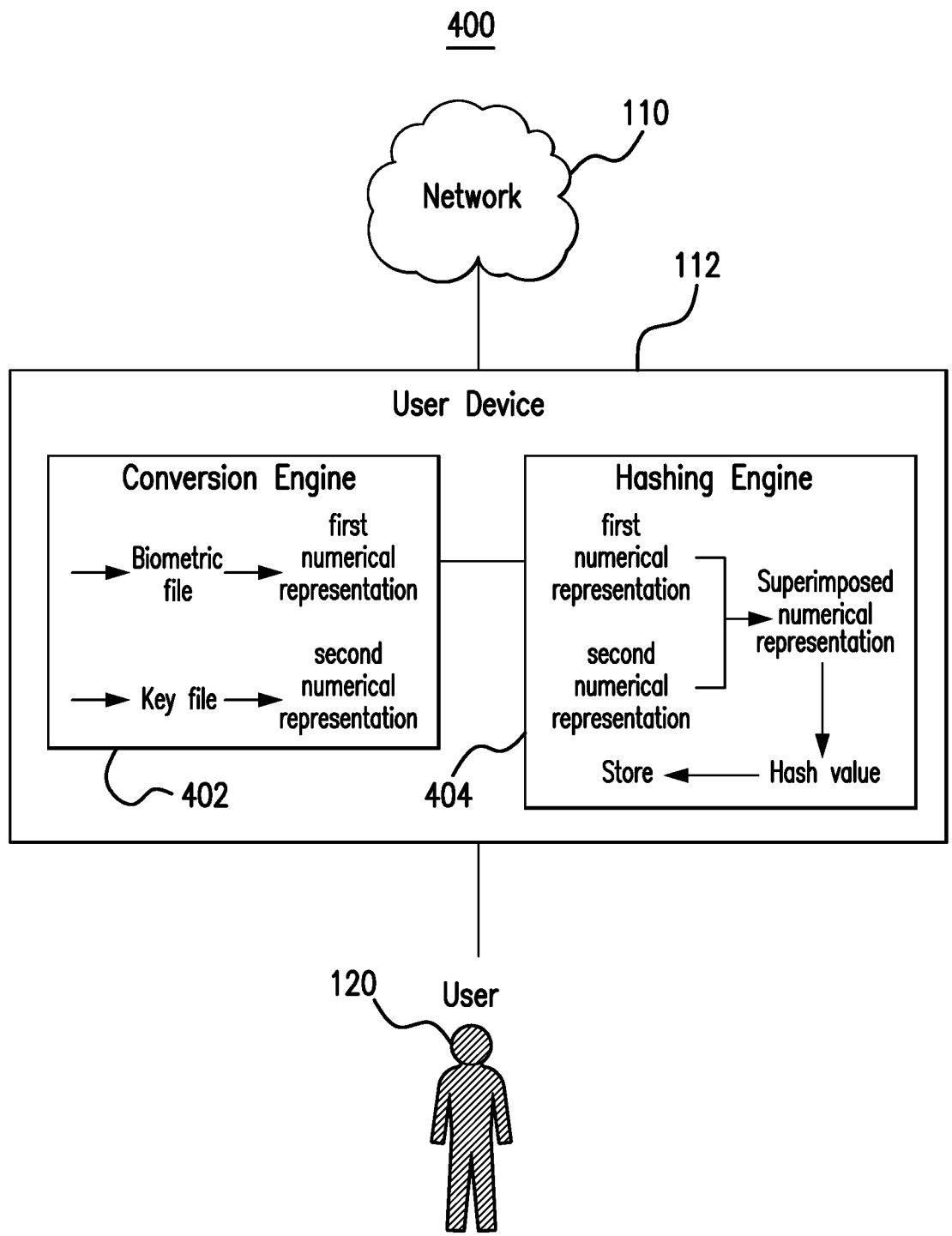
FIG. 4 illustrates an example system showing an example structure of the user device of FIG. 1.

FIG. 4 illustrates an example system 400 showing an example structure of the user device 112 of FIG. 1. In this example, user device 112 is shown connected to network 110 and user 120 and contains conversion engine 402 and hashing engine 404. In some embodiments, some or all of the components of user device 112 may perform some or all of the steps of method 300, method 500, and/or the steps described with regard to FIG. 6.

Conversion engine 402, in general, converts objects (e.g., photographs, finger tips) to digital files and/or converts digital files into numerical representations, according to particular embodiments. For example, conversion engine 402 may scan or receive a fingerprint (or fingerprint representation) or image or audio file and convert the fingerprint or image or audio file into a numerical representation (different from any original, e.g. binary, representation of the image or audio file itself), such as a matrix. For example, in certain embodiments conversion engine 402 may convert a biometric file (e.g., a fingerprint scan of user 120, who wants to be authenticated by biometric identification device 102), which may be a file containing a user's biometric information, into a first numerical representation, such as a matrix. As another example, conversion engine 402 may convert a key file, which may be a file that is different from the biometric file and used to encrypt the biometric file, into a second numerical representation, such as a matrix. The key file, in some embodiments, may be the same key file used to register user 120's biometric identification information (e.g., an image of a particular Ferris wheel that the user, or biometric identification device 102, chose during registration). In example embodiments, conversion engine may perform steps 504 and 508 of method 500 of FIG. 5.

Conversion engine 402 may, in an example algorithm, receive a key file, convert the key file into a numerical representation, e.g., by segmenting the key file, creating vectors based on each segment, and creating a matrix based on the vectors. Conversion engine 402 may, in an example algorithm, receive a biometric file, convert the biometric file into a numerical representation, e.g., by segmenting the biometric file, creating vectors based on each segment, and creating a matrix based on the vectors. Conversion engine 202 may, in some embodiments, also operate according to an algorithm based on steps of methods 300 and 500 in this disclosure, e.g., steps 502-510 of method 500.

Hashing engine 404 generally receives the numerical representations processed or created by the conversion engine 402 as inputs and creates a hash value as an output, according to particular embodiments. For example, hashing engine 404 may take the first and second numerical representations and create a superimposed numerical representation that, for example, combines the first and second numerical representations, in certain embodiments, which may help encrypt some or all of the biometric file. Hashing engine 404 may create the superimposed numerical representation as described elsewhere in this disclosure, for example in step 512 of method 500 of FIG. 5 or with regard to FIG. 6. Once hashing engine 404 creates the superimposed numerical representation according to certain embodiments, it may then covert the superimposed numerical representation into a hash value (e.g., for authentication of user 120 and/or user device 112). For example, hashing engine 404 may covert the superimposed numerical representation into a hash value as described elsewhere in this disclosure, for example in steps 514 of method 500 FIG. 5 or with regard to FIG. 6. Furthermore, in some embodiments, hashing engine 404 may store the hash value, or cause it to be stored, in any suitable location. For example, the hash value may be stored in storage 116, in the cloud, or at any suitable other location. Hashing engine 404, in certain embodiments, may send the hash value to biometric identification device 102 for the purpose of authenticating user 120 or user device 112. In some embodiments, biometric identification device 102 (and, e.g., matching engine 206) may receive the hash value from user device 112 and compare it to one or more stored hash values associated with user 120 or user device 112 in order to, for example, authenticate user 120 or user device 112 and allow user 120 or user device 112 to access the system protected by biometric identification device 102. In addition, user identification device may operate as described elsewhere in this disclosure, for example as described in step 518 of method 500 of FIG. 5.

Hashing engine 404 may, in an example algorithm, create a superimposed numerical representation by performing a convolution operation of a numerical representation of a biometric file and a numerical representation of a key file (e.g., as output by conversion engine 402). Furthermore, as part of this example algorithm, hashing engine 404 may covert the superimposed numerical representation into a hash value by performing one or more (or iterative) convolution operations to reduce the superimposed numerical representation into a smaller numerical representation (e.g., a single-row array), and then convert the smaller numerical representation into a hash value (e.g., by converting the single-row array to concatenated binary and then converting the binary into a hash value). In addition, hashing engine 404 may store the hash value, e.g., for registration purposes, as part of this algorithm. Hashing engine 404 may, in some embodiments, also operate according to an algorithm based on steps of methods 300 and 500 in this disclosure, e.g., steps 512-516 of method 500.

While certain components of certain devices are shown in FIG. 4 in certain configurations, other suitable components, devices, and configurations are contemplated in this disclosure.

Figure 5:
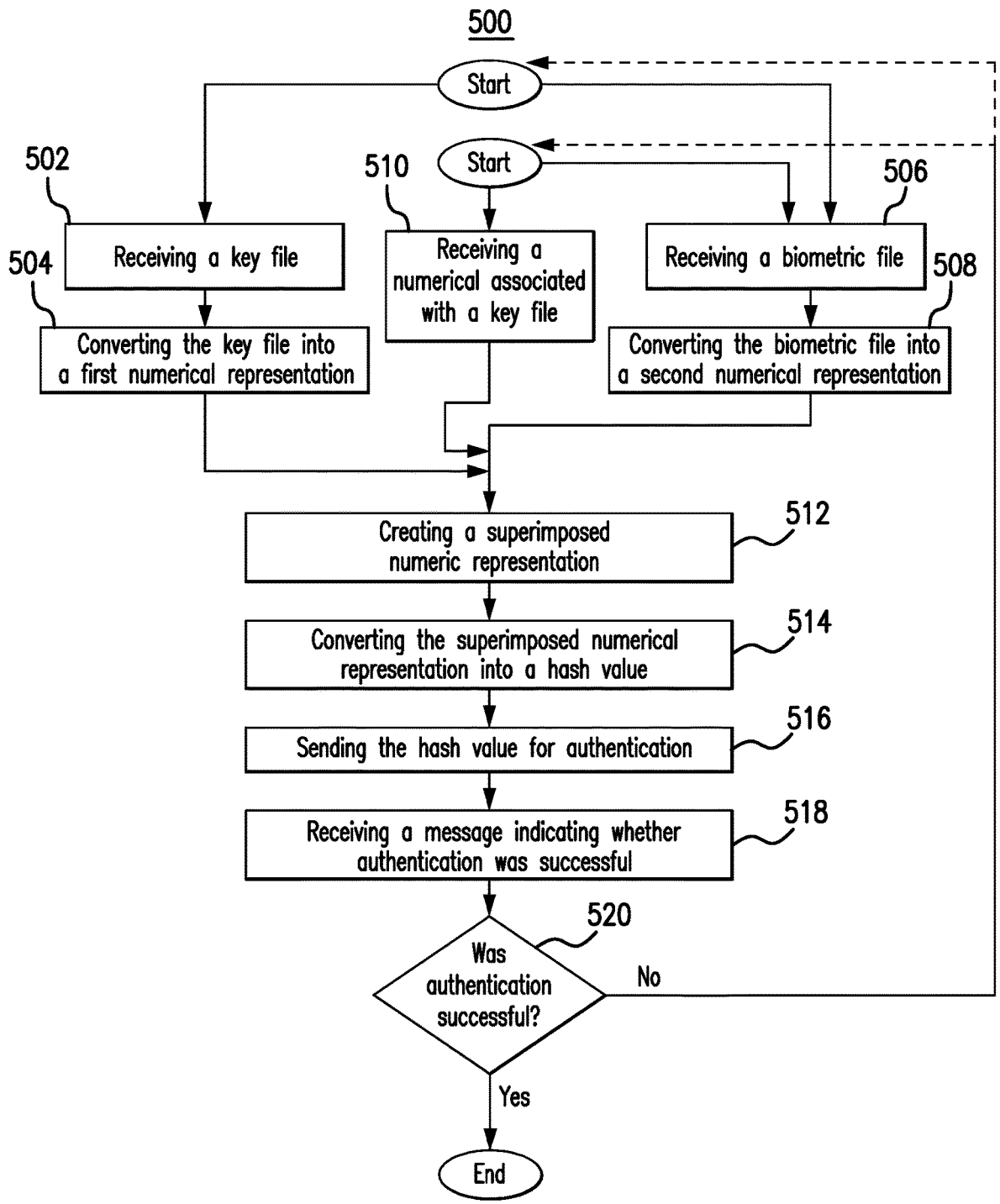
FIG. 5 illustrates an example method of authenticating and encrypting a user's biometric identification information.

FIG. 5 illustrates an example method 500 of authenticating and encrypting a user's biometric identification information. Method 500 may be performed, in some embodiments, by some or all of the components of FIGS. 1, 2, and 4. In particular embodiments, method 500 may employ some or all of the steps of FIGS. 3 and 6. Method 500 contains steps 502 through 520.

Step 502 includes receiving a key file. Step 502 may be similar or identical to step 302 in some embodiments. In certain embodiments, a key file may be received for use in authenticating a user 120 (who may already be registered) or user device 112 (which may already be registered). For example, user 120 may select (from the Internet, user device 112, or any other source) a key file for authentication that matches (e.g., is the same or similar to) a key file used during registration. As an example, a user 120 may select, using user device 112, a favorite image or sound file that matches an image or sound file chosen as a key file during registration. In certain embodiments, user device 112 may receive one or more of the key file(s) sent from a portion or component of the system being accessed (e.g., biometric identification device 102), where, for example, the one or more key file(s) were stored by biometric identification device 102 during registration. User device 112 may, in an example embodiment, receive one or more key file(s) selected randomly (e.g., by biometric identification device 102 or user device 112) from a set of key files used during registration. The key file under this step may be received from any suitable source via any suitable method.

Step 504 includes converting the key file into a first numerical representation. Step 504 may be similar or identical to step 304 in some embodiments. In certain embodiments, step 504 may be conducted by or for user device 112.

Step 506 includes receiving a biometric file. Step 506 may be similar or identical to step 306 in some embodiments. In certain embodiments, a biometric file may be received for use in authenticating a user 120 (who may already be registered) or user device 112 (which may already be registered). For example, user device 112 may scan user 120's fingerprint or iris and convert it to a biometric file for use in authentication of the user or user device.

Step 508 includes converting the biometric file into a second numerical representation. Step 508 may be similar or identical to step 308 in some embodiments. In certain embodiments, step 508 may be conducted by or for user device 112.

Step 510 includes receiving a numerical representation associated with a key file. Step 510 illustrates one of the potential variations of method 500, where, for example, user device 112 receives a numerical representation associated with a key file instead of the key file itself, which may reduce or eliminate the need for steps 502 and/or 504. A similar step could be used in some embodiments that includes receiving a numerical representation associated with a biometric file, which may reduce or eliminate the need for steps 506 and/or 508.

Step 512 includes creating a superimposed numerical representation. Step 512 may be similar or identical to step 310 in some embodiments. In certain embodiments, step 512 may be conducted by or for user device 112.

Step 514 includes converting the superimposed numerical representation into a hash value. Step 514 may be similar or identical to step 312 in some embodiments. In certain embodiments, step 514 may be conducted by or for user device 112. In some embodiments, a window W (e.g., as described in step 312) may be used in step 514 that may or may not be the same window W used during registration (e.g., during step 312).

Step 516 includes sending the hash value of step 514 for authentication. Step 516 may include sending the "second hash value" that is received in step 316 in certain embodiments. For example, user device 112 may send the hash value of step 514 (which may correspond to the "second hash value" of step 316) to biometric identification device 102 for authentication of user device 112 and/or user 120.

Step 518 includes receiving a message indicating whether authentication was successful. Step 518 may include receiving the message sent during steps 322 and/or 324 of method 300. For example, user device 112 may receive a message from biometric identification device 102 that authentication using the hash value calculated in step 514 was unsuccessful or successful.

Step 520 includes determining whether authentication was successful. In certain embodiments, whether authentication was successful may be determined by the message received in step 518. In some embodiments, user device 112 may determine that authentication was successful based on whether it detects a new or changed connection with the system secured by biometric identification device 102. If it is determined that authentication was successful, method 500 may end. If, on the other hand, it is determined that authentication was not successful, method 500 may restart at either start point shown in FIG. 5, or continue at any other suitable step in certain embodiments. In some embodiments, method 500 may continue/repeat until authentication is successful. In other embodiments, method 500 may continue/repeat until user 120 or user device 112 is blocked, locked out of, or otherwise restricted from accessing a system protected by biometric identification device 102, for example, once a certain number of failed authentications occur within a certain time period.

Although this disclosure describes and illustrates particular steps of the method of FIG. 5 as occurring in a particular order, this disclosure contemplates any steps of the method of FIG. 5 occurring in any order. An embodiment can repeat or omit one or more steps of the method of FIG. 5. In an embodiment, some or all of the steps of the method of FIG. 5 can include or replace some or all of the steps of the method of FIG. 3 (and, e.g., the steps of FIG. 6). In an embodiment, some or all of the steps of the method of FIG. 3 (and, e.g., the steps of FIG. 6) can include or replace some or all of the steps of the method of FIG. 5. Moreover, although this disclosure describes and illustrates particular components carrying out particular steps of the method of FIG. 5, this disclosure contemplates any combination of any components carrying out any steps of the method of FIG. 5.

Figure 6:
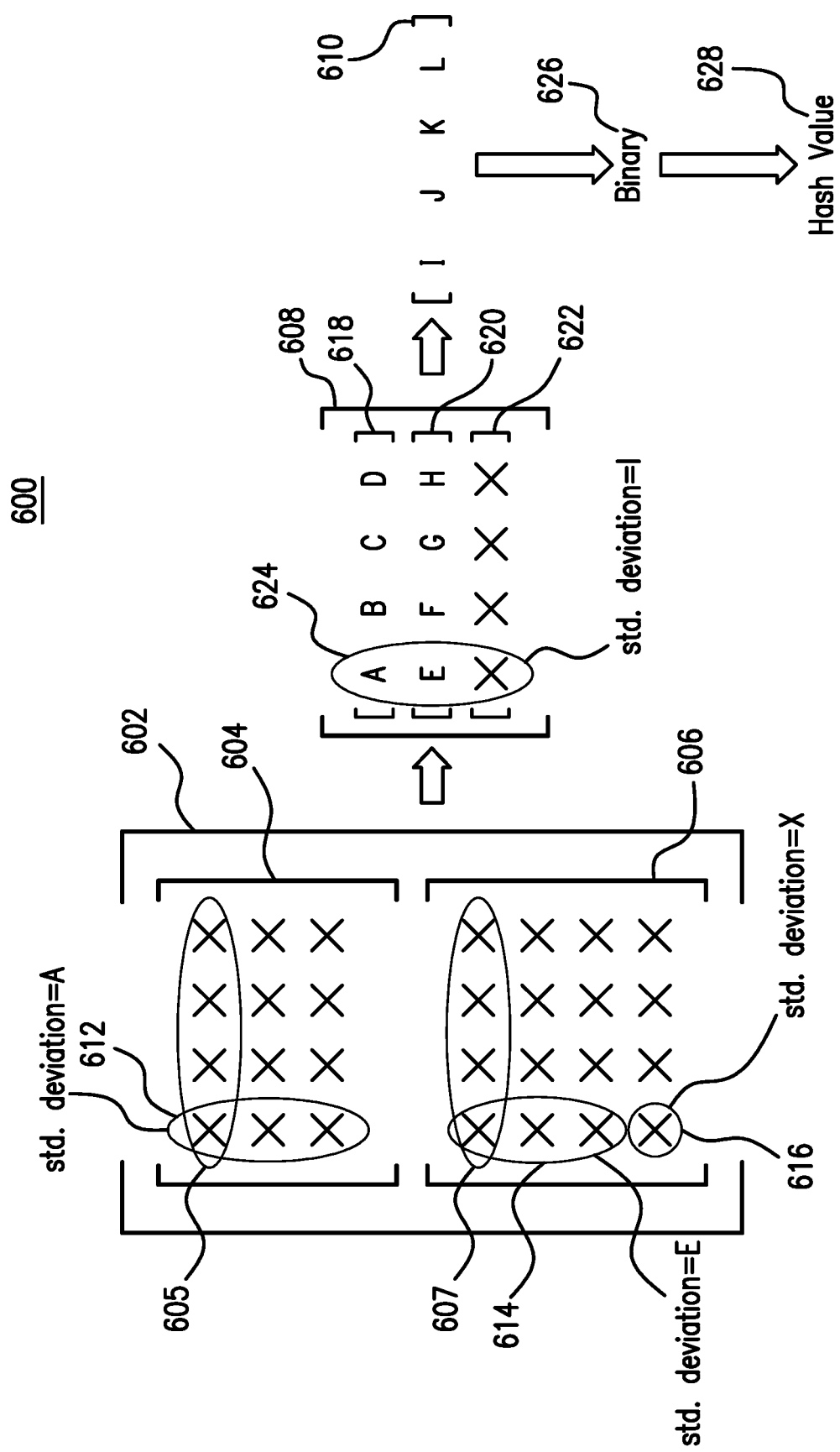
FIG. 6 illustrates an example embodiment of encrypting a user's biometric identification information by creating a superimposed numerical representation (SNR) and converting the SNR into a hash value, e.g., as discussed in the methods of FIGS. 3 and 5.

FIG. 6 illustrates an example embodiment of encrypting a user's biometric identification information by creating a superimposed numerical representation (SNR) (e.g., superimposed matrix 602) and converting the SNR into a hash value 628, e.g., as discussed in the methods of FIGS. 3 and 5. FIG. 6 shows an example convolution of a key file numerical representation (KFNR) (e.g., a matrix 604) and a biometric file numerical representation (BFNR) 606 (e.g., a matrix 606) into an SNR (e.g., matrix 602). FIG. 6 also shows converting matrix 602 into hash value 628. The example of FIG. 6 is one embodiment of how biometric identification information may be encrypted.

In this example, matrix 604 represents a KFNR. Matrix 604 may, for example, be created by converting a key file (e.g., an image other than a user's biometric image) into a numeric representation (e.g., a matrix). For example, matrix 604 may be created as described with regard to FIGS. 2-5. In an embodiment, matrix 604 may have a number of rows, e.g., three rows (including row 605), which may be vectors (e.g., feature vectors of the key image) as described in this disclosure. In addition, matrix 604 may have a number of columns, e.g., as shown as part of matrix 604. In the example of FIG. 6, the individual elements of matrix 604 are numbers, represented as "X," which may or may not be the same number.

In this example, matrix 606 represents a BFNR. Matrix 606 may, for example, be created by converting a biometric file (e.g., a biometric image) into a numerical representation (e.g., a matrix). For example, matrix 606 may be created as described with regard to FIGS. 2-5. In an embodiment, matrix 606 may have a number of rows, e.g., four rows (including row 607), which may be vectors (e.g., feature vectors of the biometric image) as described in this disclosure. In addition, matrix 606 may have a number of columns, e.g., as shown as part of matrix 606. In the example of FIG. 6, the individual elements of matrix 606 are numbers, represented as "X," which may or may not be the same number.

Matrix 604 and matrix 606 may undergo a convolution operation, such as an XOR operation, matrix multiplication, or any other suitable convolution operation to create an SNR. In an embodiment, conducting a convolution operation on matrix 604 and 606 may produce a single matrix. For example, matrix 604 and matrix 606 in FIG. 6 are joined together to make an example superimposed matrix 602.

In this example, to convert matrix 602 (the example SNR) to a hash value, matrix 602 first undergoes further convolution operations to reduce matrix 602 to a single-row array 610. First, in this example, a window W is chosen as described in this disclosure. The window in FIG. 6 is three, and is shown by the three circled elements of a first operation 612 and a second operation 614. A third operation 616 has a window of one because only one row of matrix 602 remained after accounting for the three-element window of first operation 612 and the three-element window of second operation 614.

Reduction of matrix 602 to single-row array 610 may require multiple steps in certain embodiments. In the example of FIG. 6, the first step converts matrix 602 to intermediate matrix 608, and the second step converts matrix 608 to single-row array 610. In this example, the first step starts with first operation 612, second operation 614, and third operation 616. First operation 612 takes the standard deviation of the first three elements of the first column of matrix 602, which, in this example, equals "A." "A" then becomes the first element of the first column of matrix 608 (the first element of row 618). Second operation 614 takes the standard deviation of the next three elements of the first column of matrix 602, which, in this example, equals "E." "E" then becomes the second element of the first column of matrix 608 (the first element of row 620). Third operation 614 takes the standard deviation of the next three elements of the first column; however, because only one element of the first column remains in this example, third operation 614 takes the standard deviation of this last number of the first column of matrix 608 (represented as "X"). Because the standard deviation of a single number is undefined, third operation makes the last number (here, "X") its output. "X" then becomes the third element of the first column of matrix 608 (the first element of row 622). Operations similar to operations 612, 614, and 616 are repeated for the other columns of matrix 602, creating intermediate matrix 608.

The second step converts matrix 608 (the intermediate matrix) to single-row array 610, using the same technique of the first step discussed above. For example, using the window value of 3, operation 624 takes the standard deviation of the first three elements of the first column of matrix 608 (which happens, in this example, to be all of the elements of the first column of matrix 608), which, in this example, equals "I." "I" then becomes the first element of single-row array 610. Operations similar to operation 624 are repeated for the other columns of matrix 608, creating single-row array 610.

In this example, to convert matrix 602 (the example SNR) to a hash value, single-row array 610 is converted into a hash value. For example, single-row array may first be converted into its binary representation 626, which may include concatenating the binary values of single-row array 610 to create a string of binary values. The string of binary values (e.g., binary representation 626) may then be converted into a hash value, for example, by using any suitable hashing algorithm or function.

While the example of FIG. 6 includes certain numerical representations undergoing certain steps and operations, any suitable numerical representation, steps, and operations may be used consistent with this disclosure. For example, numerical representations other than matrices may be used, different windows and values may be used, other convolution operations may be used, operations other than standard deviation may be used, other ways of converting an SNR to a hash value may be used (e.g., a hexadecimal representation instead of a binary representation), etc.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A user device, comprising:
a hardware processor configured to implement:
    a conversion engine configured to:
        scan a user to produce a biometric file comprising a biometric image and biometric identification information of the user;
        receive a key file comprising an image selected by the user from a plurality of images, the key file different from the biometric file, the selected image different from the biometric image;
        convert the biometric file into a first numeric representation; and
        convert the key file into a second numeric representation; and
    a hashing engine configured to:
        create a superimposed numeric representation by performing a convolution operation on the first numeric representation and the second numeric representation, the superimposed numeric representation comprises a matrix comprising a plurality of rows and a plurality of columns;
convert the superimposed numeric representation into a hash value by:
converting, in a first step, the matrix to an intermediate matrix by:
dividing the matrix into n window matrices each having a predefined number of rows R greater than 1;
for each window matrix of the n window matrices:
reducing the R rows in the window matrix into one row by replacing each column i of the window matrix with a standard deviation of all values in column i;
reducing, in a second step, the intermediate matrix to an array comprising a single row by repeating the first step on the intermediate matrix in a first iteration and repeating the first step a number of iterations until the array comprising the single row is obtained, wherein each given iteration repeats the first step on a matrix obtained from an iteration immediately preceding the given iteration; and
converting the array into the hash value;
send, over a network connection, the hash value for authentication, wherein the hash value is compared with a previously stored hash value using a second biometric file comprising biometric identification information of the user to determine whether authentication was successful; and
receive a message indicating whether authentication was successful.

2. The user device of claim 1, wherein the conversion engine is further configured to receive the second numeric representation over a network connection.

3. The user device of claim 1, wherein:
the key file comprises a first audio file; and
the biometric file comprises a second audio file.

4. The user device of claim 1, wherein the conversion engine is further configured to determine at least one of a plurality of vectors using a color histogram representing a plurality of colors of at least one of a plurality of segments of the biometric image.

5. The user device of claim 1, wherein the biometric image is of a fingertip of the user.

6. The user device of claim 1, wherein the biometric identification information represents a portion of the user's deoxyribonucleic acid.

7. The user device of claim 1, wherein the biometric identification information comprises a facial representation of the user.

8. An authentication system, comprising:
a user device, comprising a hardware processor configured to implement:
a conversion engine configured to:
scan a user to produce a first biometric file comprising a biometric image and biometric identification information of the user;
receive a key file comprising an image selected by the user from a plurality of images, the key file different from the biometric file, the selected image different from the biometric image;
convert the first biometric file into a first numeric representation; and
convert the key file into a second numeric representation;
a first hashing engine configured to:
create a superimposed numeric representation by performing a convolution operation on the first numeric representation and the second numeric representation, the superimposed numeric representation comprises a matrix comprising a plurality of rows and a plurality of columns;
convert the superimposed numeric representation into a first hash value by:
converting, in a first step, the matrix to an intermediate matrix by:
dividing the matrix into n window matrices each having a predefined number of rows R greater than 1;
for each window matrix of the n window matrices:
reducing the R rows in the window matrix into one row by replacing each column i of the window matrix with a standard deviation of all values in column i;
reducing, in a second step, the intermediate matrix to an array comprising a single row by repeating the first step on the intermediate matrix in a first iteration and repeating the first step a number of iterations until the array comprising the single row is obtained, wherein each given iteration repeats the first step on a matrix obtained from an iteration immediately preceding the given iteration; and
converting the array into the hash value;
send, over a network connection, the first hash value for authentication; and
receive a message indicating whether authentication was successful; and
a biometric identification device, comprising a hardware processor configured to implement:
a second hashing engine configured to:
store a second hash value calculated at least in part using a second biometric file comprising biometric identification information of the user; and
a matching engine configured to:
receive, over the network connection, the first hash value for authentication;
compare the first hash value and the second hash value; and
generate the message indicating whether authentication was successful using the comparison of the first hash value and the second hash value.

9. The authentication system of claim 8, wherein the second hash value is further calculated at least in part using the key file.

10. The authentication system of claim 8, wherein the biometric image is of a fingertip of the user.

11. The authentication system of claim 8, wherein biometric identification information represents a portion of the user's deoxyribonucleic acid.

12. The authentication system of claim 8, wherein the biometric identification information comprises a facial representation of the user.

13. A method, comprising:
scanning a user to produce a biometric file comprising a biometric image and biometric identification information of the user;
receiving a key file comprising an image selected by the user from a plurality of images, the key file different from the biometric file, the selected image different from the biometric image;

converting the biometric file into a first numeric representation;
convert the key file into a second numeric representation;
creating a superimposed numeric representation by performing a convolution operation on the first numeric representation and the second numeric representation, the superimposed numeric representation comprises a matrix comprising a plurality of rows and a plurality of columns;
converting the superimposed numeric representation into a hash value by:
converting, in a first step, the matrix to an intermediate matrix by:
dividing the matrix into n window matrices each having a predefined number of rows R greater than 1;
for each window matrix of the n window matrices:
reducing the R rows in the window matrix into one row by replacing each column i of the window matrix with a standard deviation of all values in column i;
reducing, in a second step, the intermediate matrix to an array comprising a single row by repeating the first step on the intermediate matrix in a first iteration and repeating the first step a number of iterations until the array comprising the single row is obtained, wherein each given iteration repeats the first step on a matrix obtained from an iteration immediately preceding the given iteration; and
converting the array into the hash value;
sending, over a network connection, the hash value for authentication, wherein the hash value is compared with a previously stored hash value using a second biometric file comprising biometric identification information of the user to determine whether authentication was successful; and
receiving a message indicating whether authentication was successful.

14. The method of claim 13, further comprising receiving the second numeric representation over a network connection.

15. The method of claim 13, wherein:
the key file comprises a first audio file; and
the biometric file comprises a second audio file.

16. The method of claim 13, wherein at least one of a plurality of vectors is determined using a color histogram representing a plurality of colors of at least one of a plurality of segments of the biometric image.

17. The method of claim 13, wherein the biometric image is of a fingertip of the user.

18. The method of claim 13, wherein the biometric identification information represents a portion of the user's deoxyribonucleic acid.

19. The method of claim 13, wherein the biometric identification information comprises a facial representation of the user.

\* \* \* \* \*